United States Patent [19]

Masse et al.

[11] Patent Number: 5,478,885
[45] Date of Patent: Dec. 26, 1995

[54] COMPOSITION OF EPOXY RESIN, EPOXIDIZED BLOCK POLYDIENE AND CURING AGENT

[75] Inventors: Michael A. Masse, Richmond; Kailash Dangayach, Houston; James Erickson, Katy, all of Tex.

[73] Assignee: Shell Oil Company, Houston, Tex.

[21] Appl. No.: 228,324

[22] Filed: Apr. 15, 1994

[51] Int. Cl.$^6$ .................................................. C08L 63/02
[52] U.S. Cl. .................. 525/92 H; 525/92 B; 525/92 C; 525/92 D; 525/92 F
[58] Field of Search .................................................. 525/92

[56] References Cited

U.S. PATENT DOCUMENTS

| | | | |
|---|---|---|---|
| 4,237,245 | 12/1980 | Halasa et al. | 525/272 |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 52/331.9 |
| 5,332,783 | 7/1994 | Dillman et al. | 525/92 |

FOREIGN PATENT DOCUMENTS

| | | |
|---|---|---|
| 0396780A1 | 11/1989 | European Pat. Off. . |
| 0441485A2 | 1/1991 | European Pat. Off. . |
| 01-22094 | 1/1989 | Japan . |
| 4153252 | 5/1992 | Japan . |
| 4209648 | 7/1992 | Japan . |
| 62-56417 | 9/1994 | Japan . |

*Primary Examiner*—Robert E. Sellers
*Attorney, Agent, or Firm*—Donald F. Haas

[57] ABSTRACT

The present invention provides a toughened epoxy resin composition comprising:

(a) a curable aromatic epoxy resin, (b) an epoxidized low viscosity polydiene polymer wherein the polymer contains from 1.0 to 7.0 milliequivalents of epoxy per gram of polymer, and (c) a curing agent.

14 Claims, No Drawings

COMPOSITION OF EPOXY RESIN, EPOXIDIZED BLOCK POLYDIENE AND CURING AGENT

BACKGROUND OF THE INVENTION

The invention relates to the use of epoxidized low viscosity polydiene polymers as toughening modifiers for epoxy resins. More specifically, blends of epoxy resins and epoxidized low viscosity-polydiene polymers are used for structural adhesives, coatings, especially as primers, electrical applications such as castings, coatings, encapsulants, potting compounds, solder masking compounds, and laminates and construction applications such as flooring, civil engineering, concrete repair and consolidation, secondary containment of tankage, grouts, sealants, and polymer concrete, and structural composites, and tooling, etc.

Cured epoxy resins are typically strong, rigid, hard materials. Further, because of their chemical constitution they adhere strongly to many substrate materials. These physical characteristics of cured epoxy resins make them useful in a broad range of applications. One disadvantage of cured epoxy resins is their brittle character. When subjected to impact, cyclic stresses, thermal stresses, or differences in adhesive-substrate expansivities, epoxy resins tend to fail at relatively low applied stresses in a brittle manner. The goal of much effort in this area has been to improve the toughness, or equivalently stated, the energy required to fracture, epoxy resins. Improvements in this regard lead to mechanically superior materials.

Therefore, it would be advantageous if an epoxy resin composition with increased toughness could be achieved. Importantly, the desired increase in toughness must occur with little or no sacrifice in the beneficial mechanical properties of epoxy resins such as strength, rigidity, hardness, and adhesion.

One route to this improvement is to incorporate a rubber into the epoxy matrix. Increases in toughness by incorporation of a rubber phase in an epoxy matrix are well known. Carboxy functional rubbers, as described in commonly assigned U.S. Pat. No. 3,823,107 entitled "Epoxy Resin Curing Agent Compositions, Their Preparation and Use," have been used as modifiers for epoxy resins. These carboxy functional modifiers suffer the disadvantage that they must be pre-reacted with the epoxy resin before cure so that useful improvements in properties are achieved. Anhydride or acid functional graft copolymers, as described in U.S. Pat. No. 5,115,019 entitled "Carboxy-Functional Hydrogenated Block Copolymer Dispersed in Epoxy Resin," and U.S. Statutory Invention Registration (T-4577), entitled "Epoxy Resin Composition," have been used as modifiers for epoxy resins. These rubbers also suffer the disadvantage that pre-reaction is required. Further, in some cases solvent blending and formation of emulsions of the polymeric modifier is required. The processes required to disperse these polymers possess the further disadvantage that the resulting dispersion of rubber in epoxy is sensitive to the process parameters such as temperature and shear rate during mixing, length of time of mixing, and type and amount of solvent so that inconsistent products are produced with varying properties.

A second disadvantage of epoxy resins is their propensity to absorb water leading to lowered glass transition temperatures and lessened mechanical properties. The objective of efforts in this area has been to reduce the amount of water absorbed by incorporating strongly hydrophobic materials into epoxy resins.

Low viscosity epoxidized polydiene polymers are known to be used in modification of epoxy resins. Such polymers are described in commonly assigned U.S. Pat. No. 5,229,464. These polymers are liquid epoxidized rubbers. Compatible blends of the polymers of the above-described patent and epoxy resins are described in allowed copending commonly assigned application Ser. No. 08/090,856, filed Jul. 12, 1993, U.S. Pat. No. 5,332,783, which is herein incorporated by reference. The blends described in the aforementioned patent application have the disadvantage that their compatibility with epoxy resins is limited. Their limited compatibility does not extend to a broad range of epoxy resins and curing agents. Compatibilizing curing agents are required. They have the further disadvantage that even when marginally compatible, these polymers do not yield final cured epoxy resins having improved toughness. Additionally, the compatibilizing curing agents lead to cured epoxy resins have significantly reduced rigidity which makes them applicable in only limited applications.

The low viscosity epoxidized polymers of the present invention yield novel cured epoxy resin compositions having a superior balance of properties. The beneficial properties of the cured epoxy resin composition such as strength, rigidity, and hardness are maintained at high and useful levels while the toughness is simultaneously increased. Therefore, the compositions of the present invention present a broad utility. Additionally, the epoxidized polymers of the present invention are simply blended with epoxy resins before cure with no pre-reaction or solvent required. Further, it is anticipated that the strongly hydrophobic character of the epoxidized polydiene polymers will reduce the amount of water absorbed by the rubber modified epoxy resin.

SUMMARY OF THE INVENTION

This invention is a toughened epoxy resin composition containing an epoxidized low viscosity polydiene polymer. These low viscosity polymers may contain up to 60% by weight, of at least one vinyl aromatic hydrocarbon, preferably styrene. Polyisoprene, in the linear, radial, or star configuration, may be used. The polymers may be block or randomly copolymerized copolymers of at least two conjugated dienes, preferably isoprene and butadiene. Preferred polymers for use in this invention are described in copending, commonly assigned, U.S. Patent application Ser. No. 08/228,047, entitled "Epoxidized Low Viscosity Rubber," filed concurrently herewith, which is herein incorporated by reference. These polymers generally have a molecular weight (peak, as determined by GPC) of from 1000 to 300,000, preferably from 1000 to 100,000, and most preferably from 1000 to 20,000 and are preferably liquids.

The preferred epoxidized low viscosity polydiene polymer has the structural formula

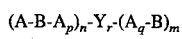

wherein Y is a coupling agent or coupling monomers or initiator, and wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. Generally, it is preferred that the A blocks should have a greater concentration of more highly substituted aliphatic double bonds than the B blocks have. Thus, the A blocks have a greater concentration of di-, tri-, and tetra-substituted unsaturation sites (aliphatic double bonds) per unit of block mass than do the B blocks.

This produces a polymer wherein the most facile eposication occurs in the exterior blocks—the A blocks ( 1,1-disubstituted, 1,2-disubstituted, 1,1,2-trisubstituted and 1,1,2,2-tetrasubstituted olefinic epoxides). It is also possible that the arms of the of formula may be (B-A-B) and (B-A). The A blocks have a molecular weight of from 100 to 6,000, preferably 100 to 3,000, most preferably 500 to 2000, and the B blocks have amolecular weight of from 1000to 15,000, preferably a3,000 to 7,000. n is greater than 0, r is 0 or 1, m is greater than or equal to 0, and n + m ranges from 1 to 100. p and q may be 0 or 1. The epoxidized polymers have an epoxy content of from 1.0 to 7.0 milliequivalents of epoxy per gram of polymer (meq/g) when at least 5% vinyl aromatic hydrocarbon is present in the polymer and 3.0 to 7.0 when there is less than 5%. The polymers must contain some unsaturation to be useful herein.

The low viscosity epoxidized polymers are used in blends with aromatic epoxy resins in an amount of from 1 to 50% by weight, preferably 1 to 30%. The epoxy resin composition also contains a curing agent.

DETAILED DESCRIPTION OF THE INVENTION

The invention composition includes an epoxy resin. Suitable aromatic epoxy resins include glycidyl ethers prepared by the reaction of epichlorohydrin with an aromatic compound containing at least two hydroxyl group carried out under alkaline reaction conditions. The epoxy resin products obtained when the hydroxyl group-containing compound is bisphenol-A are represented below by the structure below wherein n is zero or a number greater than 0, commonly in the range of 0 to 10, preferably in the range of 0 to 2.

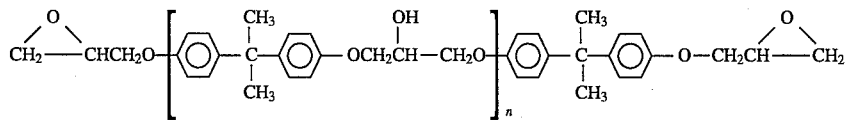

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 86 to about 10,000, preferably about 200 to about 1500. The commercially-available epoxy resin EPON® Resin 828, a reaction product of epichlorohydrin and 2,2-bis(4-hydroxyphenyl-propane) (bisphenol-A) having a molecular weight of about 400, an epoxide equivalent (ASTM D-1652) of about 185–192, and an n value (from the formula above) of about 0.13, is presently the preferred epoxy resin because of its low viscosity, mechanical performance, and commercial availability. Other examples of aromatic epoxy resins are liquid resins such as EPON® 825, a reaction product of epichlorohydrin and bisphenol-A with an n value of about 0.04, EPON® 826, a reaction product of epichlorohydrin and bisphenol-A with an n value of about 0.08, and solid resins such as EPON® 1001, a reaction product of epichlorohydrin and bisphenol-A with an n value of about 2.3, EPON® 1002, a reaction product of epichlorohydrin and bisphenol-A with an n value of about 3.4, EPON® 1031, a reaction product of epichlorohydrin and tetraphenylol ethane with an epoxide equivalent weight of about 220, and the like.

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl- 1,3-hexadiene, 4,5-diethyl- 1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The epoxidized low viscosity polymers of the present invention have the general formula $$(A\text{-}B\text{-}A_p)_n\text{-}Y_r\text{-}(A_q\text{-}(B))_m$$

wherein Y is a coupling agent or coupling monomers or initiator, and wherein A and B are polymer block which may be homopolymer blocks of conjugated diolefin monomers, copolymer blocks of conjugated diolefin monomers, or copolymer blocks of diolefin monomers and monoalkenyl aromatic hydrocarbon monomers. Polymers of this type are described in more detail in U.S. Pat. No. 5,229,464 which is herein incorporated by reference. Generally, it is preferred that the A blocks should have a greater concentration of more highly substituted aliphatic double bonds than the B blocks have. Thus, the A blocks have a greater concentration of di-, tri-, and tetra-substituted unsaturation sites (aliphatic double bonds) per unit of block mass than do the B blocks. This produces a polymer wherein the most facile epoxidation occurs in the exterior blocks—the A blocks (1,1-disubstituted, 1,2-disubstituted, 1,1,2-trisubstituted and 1,1,2,2-tetrasubstituted olefinic epoxides). The A blocks have a molecular weight of from 100 to 6,000, preferably 100 to 3,000, most preferably 500 to 2000, and the B blocks have a molecular weight of from 1000 to 15,000, preferably 3000 to 7000. n is greater than 0, r is 0 or 1, m is greater than or equal to 0, and n+m ranges from 1 to 100. p and q may be 0 or 1.

Useful randomly epoxidized star polymers are described in U.S. Pat. No. 5,247,026 which is herein incorporated by reference. That patent describes randomly epoxidized star polymers, based on at least one conjugated diolefin monomer, that contain di-, tri- and/or tetrasubstituted olefinic epoxides. The star polymers have greater than four arms or branches. Each arm has a molecular weight from 1500 to 20,000 and contains the concentration of di-, tri-, or tetra-substituted olefinic epoxides (1,1-disubstituted, 1,2-disubstituted, 1,1,2-trisubstituted and 1,1,2,2-tetrasubstituted olefinic epoxides) described below.

Polyisoprene homopolymers which have been epoxidized to the required extent may also be useful in toughening epoxy resins. Such polymers must be low viscosity and low molecular weight - the molecular weight should be in the range from 1000 to 20,000. These polymers, as all of the polymers described herein, may contain some amount of a vinyl aromatic hydrocarbon, preferably styrene, as described below.

When the concentration of alkenyl aromatic hydrocarbon monomer in the epoxidized polymer is less than or equal to 5% by weight, the concentration of epoxide may range from 3 to 7 meq/g of polymer. When the concentration of alkenyl aromatic hydrocarbon monomer is from 5% up to 20% by weight, the concentration of epoxide may range from 2 to 7 meq/g of polymer. When the concentration of monoalkenyl aromatic hydrocarbon is from 20% to 60% by weight, the concentration of epoxide may range from 1 to 7 meq/g of polymer. If the epoxy levels are any lower, the components are not sufficiently compatible to toughen the resin. Also, at lower levels, the mixing temperature will have to be undesirably high. At higher epoxy levels, the components will be too compatible and soluble to achieve the desired phase separation upon curing. It will also raise the viscosity and the cost without any corresponding benefit.

The preferred epoxy levels are 3.5 to 6 meq/g for less than 5% vinyl aromatic hydrocarbon, 3 to 6 for 5 to 20%, and 1.5 to 6 for 20 to 60%. If the epoxy levels are lower, then cloud points of 85° C. or lower cannot be achieved without additional formulating ingredients. This is an indication of a uniform, compatible blend with uniform appearance and feel. Higher epoxy levels are not preferred for the same reason and also that they increase the viscosity and cost without any appreciable benefit.

It has been found that by the proper combination of unsaturation, epoxide level, and alkenyl aromatic monomer content, a low viscosity polydiene which possesses suitable compatibility with epoxy resins to yield an improved balance of properties can be made. The presence of epoxidation and unsaturation is required in the low viscosity polymers of this invention. The diene monomers remain unsaturated before epoxidation in the preferred polymers. When alkenyl aromatic monomers are present at concentrations of less than 5% by weight, the most preferred epoxide level ranges from 4.5 to 5.5 meq/g of polymer. When alkenyl aromatic monomers are incorporated at levels of 5% up to 20% by weight in the largely unsaturated polydiene block copolymer, its compatibility with epoxy resin is improved to such a degree that lower levels of epoxidation will yield improved rubber modified epoxy resins and the most preferred range is 4 to 5.5. When alkenyl aromatic monomers are present at concentrations of 20% to 60% by weight or greater, the most preferred epoxide level ranges from 2 to 4.5 meq/g of polymer. These ranges are believed to be optimum because they allow blends to be made with a cloud point of no more than about 70° C. (low end of rage) and as low as 40° to 50° C. (high end of rage). It is believed that such compositions have the proper phase separation to achieve compositions with the best combination of properties, appearance, and feel.

The ability to form suitably compatible blends with epoxy resins is one primary feature of the molecules of the present invention. While the preferred epoxidized polymers are largely unsaturated, analogous hydrogenated polymers may also be suitable. In polymers of high epoxy and styrene content it is anticipated that suitable compatibility with epoxy resins will result even when all the unsaturation is consumed by hydrogenation. These polymers offer the further advantages of improved chemical resistance and improved thermo-oxidative, oxygen, ozone and ultraviolet stability.

Blends of epoxy resins with the higher epoxy content polymers of the present invention are physically different than blends of epoxy polymers with the lower epoxy content epoxidized polymers of U.S. Pat. No. 5,229,464 and the afore-mentioned copending patent application. The blends of the present invention are stronger and more rigid. The uses for the blends of the present invention are ones which require a modified epoxy composition with better toughness and strength than the blends of the copending patent application. It appears that the improved compatibility of the polymers of the present invention results in modified epoxy resins in which there is better dispersion of the rubber phase in the epoxy matrix.

In order to get the desired balance of properties for the compositions of the present invention, i.e., improved toughness with little or no sacrifice in strength, rigidity, or adhesion, it is important that there be some phase separation between the components in the final cured product. If the incorporated epoxidized rubber will not phase separate from the epoxy matrix during cure, the final product will be too weak and not stiff enough for enduses such as structural adhesives, coatings, and electrical encapsulation. If the amount of phase separation is too great, then the epoxidized polymer will not be finely dispersible in the epoxy matrix resulting in no property improvement and a deleterious degradation of final product appearance and product uniformity. The goal is to achieve a composition which is on the edge of compatibility and incompatibility and each epoxy resin formulation may have its own particular epoxidized polydiene polymer that works best in this regard. The epoxy level, degree of unsaturation, and styrene content of the preferred polymers of this invention are specified herein to achieve such a degree of compatibility with epoxy resins.

In another embodiment of this invention, a blend of an epoxidized polymer rubber polydiene used as a toughness modifier and a low molecular weight epoxy functional diluent used as a flexibilizer are simultaneously employed as modifiers for epoxy resins. These diluents include aliphatic mono-, di-, and multi-functional epoxy resins, and epoxy functional oils.

Epoxy resin matrices are typically very brittle. In order to improve their performance, their fracture toughness can be increased. Fracture toughness is a measure of energy required to fracture a material. One way to increase the energy required for fracture is to incorporate a relatively low modulus second phase in the epoxy resin matrix. This second phase acts to build in sites of stress concentration where local deformation can occur rather than catastrophic bulk deformation (brittle fracture). Also, this second phase can act to blunt or terminate growing cracks and it can absorb energy by deformation and cavitation.

However, a second mode of matrix toughening can be pursued. In this second mode, the brittle aromatic epoxy resin matrix is flexibilized by incorporating a flexible additive (diluent) molecularly into the covalent resin network. This second mode by itself would give improvements in toughness but would cause significantly more degradation of the strength and rigidity of the matrix than the first mode.

The use of both modes of toughening simultaneously leads to toughnesses higher than achievable by either mode alone. The first mode of toughening is the mode described above which is accomplished by blending with the epoxy resin an epoxidized low viscosity polydiene polymer rubber containing a vinyl aromatic hydrocarbon which is epoxidized in an amount above, 1 up to 7 meq of epoxy per gram of polymer or the same polymer without vinyl aromatic hydrocarbon epoxidized at 3 to 7 meq/g. The second mode of improvement in toughening is achieved by blending with a low molecular weight reactive diluent.

The mixture of the epoxidized rubber and low molecular weight reactive diluent, then, contains one fraction which due to its composition is only marginally compatible with the epoxy matrix (the epoxidized rubber) and another fraction which is relatively compatible with the epoxy matrix (the low molecular weight reactive diluent). The marginally compatible fraction forms a minor phase upon curing of the epoxy resin and acts as the first mode toughener. The relatively compatible fraction is molecularly incorporated into the epoxy network and so acts as the second mode toughener. For best results, the weight ratio of the epoxidized polymer to the low molecular weight reactive diluent should range from 100/1 to 1/10. The diluent may replace part of the epoxidized polymer in the composition of the invention.

Examples of useful flexibilizers are aromatic monofunctional epoxy resins, aliphatic mono-, di-, and multi-functional epoxy resins, and epoxy functional oils. Examples of monofunctional epoxy resins useful herein as flexibilizers are cresyl glycidyl ether, butyl glycidyl ether, phenyl glycidyl ether, and the like. Other epoxy functional materials are also useful in the blends. Examples of epoxy functional oils include epoxidized linseed oil, epoxidized soybean oil, epoxidized castor oil, and vernonia oil. These additional epoxy functional materials are low molecular weight oils and also tend to impart lower viscosities to adhesive formulations incorporating the compositions of the present invention.

The epoxy resin/epoxidized polydiene rubber compositions may be combined with epoxidized aliphatic resins, including cycloaliphatic resins, to achieve advantages in thermo-oxidative stability and weatherability. Generally, suitable epoxy resins include a broad range of liquid or solid resins characterized by the presence of, on average, at least one 1,2-epoxy group (i.e. vicinat epoxy group) per molecule. Examples of suitable epoxy resins include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized diunsaturated acid esters, epoxidized unsaturated polyesters, epoxy novolacs, and copolymers and mixtures thereof. These resins may replace part of the epoxy resin in the composition herein and may be present in a weight ratio of epoxy resin to aliphatic resin of 1000:1 to 1: 1000. Monofunctional resins tend to impart flexibility to the product. Examples of aliphatic epoxy resins are the HELOXY® series resins (aliphatic mono-, di-, and multifunctional epoxies made by Shell Chemical Company) EPON® 871 (diglycidyl aliphatic ester epoxy made by Shell Chemical Company), and UVR-6110 (a difunctional cycloaliphatic epoxy made by Union Carbide Corporation).

The epoxidized rubber modified epoxy resins can be cured by a variety of means. Suitable epoxy curing agents include anionic initiators, cationic initiators, carboxy functionalized polyesters, polyamides, amidoamines, polyamines, melamineformaldehydes, phenol-formaldehydes, urea-formaldehydes, dicyandiamide, polyphenols, polysulfides, ketimines, novolacs, anhydrides, blocked isocyanates, anhydrides, and imidazoles. The composition will generally contain from about 1 to about 60, preferably about 30 to about 60, weight percent curing agent based on the epoxy resin composition.

Anhydride curing agents are commonly used. Such anhydride curing agents may be generally described as any compound containing one or more anhydride functional groups. Most commonly used anhydrides have an aromatic, cycloaliphatic, or aliphatic structure. The curing agent may be selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids other than polycarboxylic acids, and polycarboxylic acids. Examples include phthalic anhydride (PA), tetrahydrophthalic anhydride (HtPA), nadic methyl anhydride (NMA), hexahydrophthalic anhydride (HHPA), pyromellitic dianhydride (PMDA), methyltetrahydrophthalic anhydride (MTHPA), and dodecenylsuccinic anhydride (DSA), and the like. In addition, multifunctional carboxylic acids will provide similar performance. The anhydride is combined with the modified epoxy resins such that a suitable anhydride/molar ratio is achieved. This ratio should range from 0.8/1.0 to 1.2/1.0 to achieve suitably complete epoxy network formation. We have found that the ratios which are most useful in achieving improved properties are those that are as close as possible to 1/1. Typically, the anhydride cures are conducted at elevated temperatures, 100° to 170° C. for a period of 30 minutes to 6 hours, and are often referred to as "bake cures." The anhydride bake cures can be accelerated by using a curing accelerator.

Suitable curing accelerators include trialkyl amines, hydroxyl-containing compounds and imidazoles. Benzyldimethylamine (BDMA), 2-ethyl-4-methylimidazole (EMI) and $BF_3$ amine complexes have been found to work well in curing the blends of the present invention.

Aliphatic amines such as diethylene triamine (DETA) and triethylene tetraamine (TETA) are useful for curing the modified epoxy resins of the present invention. Aromatic amines such as diethyltoluenediamine and metaphenylenediamine (MPDA) are useful for the curing of the compositions of the present invention. Aromatic and aliphatic amines are generally used in an equivalent ratio of from 0.8/1.0 to 1.2/1.0 but it is preferred that the ratios be as close as possible to 1/1. Polyamides such as EPI-CURE® 3140 polyamide curing agent supplied by Shell Chemical Company are also useful in the cure of the modified epoxy compositions. Usually, from 30 to 130 parts per hundred parts of resin of polyamide is used. There is a wide range of reactivity of the various amines and polyamide curing agents and thus both room temperature and bake cures can be performed by proper choice of the curing agent and its proportion. Sulfonium salts of low nucleophilicity, 2-ethyl-a-methyl-imidazole, benzyldimethylamine (BDMA), lanthanide (III) trifluoromethane sulfonates, lithium perchlorate, and the like may also be used at catalytic levels (i.e., 0.1 to 10 parts per hundred parts of resin) to increase the rate of cure of the amine and polyamide curing agents.

The cured blends of the present invention may be used in structural adhesive compositions. Epoxy resins are known for their utility in such compositions. The blends of the present invention have a higher toughness when used in a structural adhesive than structural adhesives using epoxy resins alone.

Various types of fillers can be included in the epoxy resin composition. A wide variety of fillers can be used. Suitable fillers include calcium carbonate, clays, talcs, zinc oxide, titanium dioxide, silica, iron oxide, mica, alumina, antimony trioxide, and the like. The amount of filler usually is in the range of 0 to about 80% by weight of the formulation depending on the type of filler used and the application for which the formulation is intended. Preferred fillers are silica and titanium dioxide.

In structural composites applications, the epoxy resin composition includes reinforcing fibers. Such reinforcing fibers suitable for use are glass fibers, graphite fibers, carbon fibers, silicon carbide fibers, aramid fibers, boron fibers, alumina fibers, and the like.

Other thermosettable resins that may optionally be included in the composition include for example, polyurethane, polyureas, polyamides, brominated epoxies, phenoxy resins, polyesters, polyester-polyether copolymers, bismaleimides, polyimides, and mixtures and copolymers thereof.

The invention composition may include other additives, such as extenders, plasticizers, pigments, reinforcing agents, flow control agents and flame retardants.

Stabilizers known in the art may also be incorporated into the adhesive composition. These may be for protection during the life of the article against, for example, oxygen, ozone and ultra-violet radiation. These may also be for stabilization of thermooxidative degradation during elevated temperature processing. Antioxidants which interfere with the curing reaction should be avoided.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pour sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, New York, 1979.

2. *Light Scattering From Polymer Solutions*, M. B. Huglin, ed., Academic Press, New York, New York, 1972.

3. W. K. Kai and A. J. Havlik, *Applied Optics*, 12, 541 (1973).

4. M. L. McConnell, *American Laboratory*, 63, May, 1978.

If desired, these block copolymers can be partially hydrogenated. Hydrogenation may be effected selectively as disclosed in U.S. Patent Reissue 27, 145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference.

The toughened epoxy resin compositions of this invention may be used in a broad variety of applications. They are useful in adhesives, including contact adhesives, laminating adhesives, and assembly adhesives, but they have special utility in structural adhesives where they may be combined with a broad range of curing agents to form excellent products which adhere to metals, plastic, wood, glass, and other substrates. They also have special utility in coatings (especially primers, topcoats for automotive, epoxy primers for metal, polyester coil coatings, alkyd maintenance coatings, etc.) where they may be combined with pigments and curing agents to form excellent products. Other applications for these compositions include electrical applications such as castings, encapsulants, potting compounds, solder masking compounds, and laminates and construction applications such as flooring, civil engineering, concrete repair and consolidation, secondary containment of tankage, grouts, sealants, polymer concrete, structural composites, tooling, etc.

EXAMPLES

Several performance properties of the cured modified epoxy resin compositions of the present invention are important. The tensile properties such as strength, elongation, and Young's modulus are measured according to ASTM D-638. The flexural properties such as flexural modulus, stress and strain at failure are measured according to ASTM D-790. The tensile fracture toughness as characterized by the stress intensity factor ($K_{IC}$) for crack propagation is measured according to ASTM E-399-83. Using the value of $K_{IC}$ so measured, the fracture energy ($G_{IC}$) was calculated for the plane strain conditions employed. The adhesive properties such as lap shear stress are measured according to ASTM D-1002. The glass transition temperature ($T_g$) is measured using torsional bar dynamic mechanical analysis.

Table I below describes the composition of the epoxidized polydiene polymers used in the following examples.

TABLE I

| Identification | Base Polymer Architecture | Molecular Weights (in thousands) | Styrene Content (%) | Epoxy Level (meq/g) | Hydrogenated (Y/N)* |
|---|---|---|---|---|---|
| A | I-B | 0.88–4.08 | 0 | 5.2 | N |
| B | I-B | 0.88–4.08 | 0 | 4.3 | N |
| C | I-B | 0.88–4.08 | 0 | 3.6 | N |
| D | I/S-B-I/S | 1.18/0.68–3.82–0.68/0.39 | 16 | 2.2 | N |
| E | I/S-B-I/S | 1.18/0.68–3.82–0.68/0.39 | 16 | 3.4 | N |
| F | I/S-B | 1.18/0.68–3.82 | 12 | 4.4 | N |
| G | I/S-B | 1.18/0.68–3.82 | 12 | 4.9 | N |
| H | I-S/B-I | 1.0–2.5/1.5–1.0 | 39 | 2.2 | N |
| I | (I-B)4 | (0.9–4.5)4 | 0 | 0.7 | N |
| II | I-S/B-I | 1.0–2.5/1.5–1.0 | 39 | 1.2 | Y |
| III | I/S-B-I/S | 1.18/0.68–3.82–0.68/0.39 | 16 | 0.8 | N |

*Y = Yes, N = No

In the base polymer architecture column of Table I, B represents poly(1,3-butadiene) blocks, I represents polyisoprene blocks, and S represents polystyrene blocks, respectively. Blocks are separated by a dash. Random copolymer blocks are represented by I/S and S/B for randomly copolymerized isoprene and styrene and randomly copolymerized styrene and butadiene, respectively. Star or radial polymers having n arms are represented in parentheses, ( )$_n$.

Example 1

The compatibility of the epoxidized polymers in blends with EPON® 826 epoxy resin was evaluated by measurement of their cloud points. The cloud point is defined as that temperature at which the blend becomes turbid. The turbidity of the blend indicates formation of a phase separated morphology with particles of sufficient size to scatter light. Epoxidized polymer/epoxy resins blends with excessively high (>150° C.) cloud points are not useful for the present invention because this prohibits mixing of the epoxidized polymer and epoxy resin.

In this example blends of epoxidized polymers having the structure I-B or (I-B)$_n$ with EPON® 826 resin are demonstrated and compared. Table II lists the cloud points for blends at various epoxidized polymer concentrations.

TABLE II

Cloud Points of Blends of Epoxidized Polymer with EPON® 826 at Various Epoxidized Polymer Levels

| Epoxidized Polymer | Cloud Point (°C.) | | | | |
|---|---|---|---|---|---|
| | @ 10% Polymer | @ 20% Polymer | @ 30% Polymer | @ 40% Polymer | @ 50% Polymer |
| A | 46 | 37 | 28 | <22 | <22 |
| B | 82 | 74 | 62 | 49 | 34 |
| C | 123 | 118 | 108 | 102 | 88 |

TABLE II-continued

Cloud Points of Blends of Epoxidized Polymer with EPON® 826 at Various Epoxidized Polymer Levels

| Epoxidized Polymer | Cloud Point (°C.) | | | | |
|---|---|---|---|---|---|
| | @ 10% Polymer | @ 20% Polymer | @ 30% Polymer | @ 40% Polymer | @ 50% Polymer |
| I | >150 | >150 | — | — | — |

The cloud point of epoxidized polymers A, B, and C are well below 150° C. at concentrations up to 50% polymer. Thus, epoxidized polymers A, B, and C are suitable for use in the present invention. The comparative polymer I (which has a similar structure) is unable to be mixed with EPON® 826 resin because of its excessively high cloud point. Comparative polymer I corresponds directly to polymer 103 (0.7 meq/g of epoxy) of the afore-mentioned patent application. This demonstrates that polymers of the structure I-B or (I-B)$_n$ require epoxy levels greater than 0.7 meq/g to be useful.

Example 2

The cloud point of blends of epoxidized polymers having the structure I/S-B-I/S and I/S-B and EPON® 826 epoxy resin were measured as in Example I. Table III lists the cloud points for blends of various epoxidized polymer level.

TABLE III

Cloud Points of Blends of Epoxidized Polymer with EPON ® 826 at Various Epoxidized Polymer Levels

| Epoxidized Polymer | Cloud Point (°C.) | | | | |
|---|---|---|---|---|---|
| | @ 10% Polymer | @ 20% Polymer | @ 30% Polymer | @ 40% Polymer | @ 50% Polymer |
| D | 114 | — | — | — | — |
| E | 102 | 106 | — | — | — |
| F | 66 | 60 | 52 | 43 | 36 |
| G | 62 | 57 | 46 | 37 | 25 |
| III | >150 | >150 | — | — | — |

The cloud point of epoxidized polymers D through G are well below 150° C. at concentrations up to 50%. These polymers contain at least 12% styrene monomer by weight. At these concentrations, polymer D is suitable for use in the present invention at an epoxy level of 2.2 meq/g. Likewise, polymers E, F, and G, all at higher epoxy levels, are also suitable for use in the present invention. However, comparative polymer III (which has a similar structure) with 16% by weight styrene and an epoxy level 0.8 meq/g of polymer has an excessively high cloud point and cannot be mixed with EPON® 826 resin.

Example 3

The cloud points of blends of epoxidized polymers having the structure I-S/B-I and EPON® 826 resin were measured as in Example 1. Table IV lists the cloud points for blends at various epoxidized polymer concentrations.

TABLE IV

Cloud Points of Blends of Epoxidized Polymer with EPON ® 826 at Various Epoxidized Polymer Levels.

| Epoxidized Polymer | Cloud Point (°C.) | | |
|---|---|---|---|
| | @ 10% Polymer | @ 20% Polymer | @ 30% Polymer |
| H | 72 | — | 70 |
| II | >150 | >150 | — |

The cloud point of the blend of epoxidized polymer H and EPON® 826 resin is well below 150° C. and so is suitable for use in the present invention. Polymer H has an epoxy level of 2.2 meq/g and is not hydrogenated. The cloud point of the blend containing comparative polymer II (which has a similar structure) is excessively high and polymer II cannot be mixed with EPON® 826 resin and so is unsuitable for use in the present invention. Comparative polymer II has an epoxy level of 1.2 meq/g and the diene monomer units have been hydrogenated. Comparative polymer II corresponds directly to polymer 204 of the afore-mentioned patent application.

Example 4

The compatibility of epoxidized polymer C, having the structure I-B, with a mixture of EPON® 828 resin, a diglycidyl ether of bisphenol-A, and UVR-6110, a cycloaliphatic epoxy resin is described. Table V lists the cloud points for the blends having 10 % and 20 % epoxidized polymer.

TABLE V

Cloud Points of Ternary Blends of Epoxidized Polymer C, EPON ® 828, and UVR-6110

| Blend Composition, Wt % | | | Cloud Point |
|---|---|---|---|
| Polymer C | EPON ® 828 | UVR-6110 | (°C.) |
| 10 | 90 | 0 | 126 |
| 10 | 81 | 9 | 117 |
| 10 | 72 | 18 | 106 |
| 10 | 63 | 27 | 94 |
| 10 | 54 | 36 | 82 |
| 10 | 4 | 45 | 69 |
| 10 | 36 | 54 | 56 |
| 10 | 27 | 63 | 41 |
| 10 | 18 | 72 | <23 |
| 10 | 9 | 81 | <23 |
| 20 | 80 | 0 | 123 |
| 20 | 72 | 8 | 112 |
| 20 | 64 | 16 | 102 |
| 20 | 5 | 24 | 91 |
| 20 | 48 | 32 | 80 |
| 20 | 40 | 40 | 67 |
| 20 | 32 | 48 | 52 |
| 20 | 24 | 56 | 37 |
| 20 | 1 | 64 | <23 |
| 20 | 8 | 72 | <23 |

The cloud points of the binary blends of EPON® 828 resin and UVR-6110 are below room temperature for all compositions. The cloud points of the ternary blends listed in Table V are all well below 150° C. Thus, epoxidized polymers blended with aromatic and cycloaliphatic epoxy resins are suitable for use in the present invention.

Example 5

The compatibility of epoxidized polymer F, having the structure I/S-B, with a mixture of EPON® 828 resin, a diglycidyl ether of bisphenol-A, and UVR-6110, a cycloaliphatic epoxy resin, is described. Table VI lists the cloud points for the blends having 10% and 20% epoxidized polymer.

TABLE VI

Cloud Points of Ternary Blends of Epoxidized Polymer F, EPON ® 828, and UVR-6110

| Blend Composition, Wt % | | | Cloud Point |
|---|---|---|---|
| Polymer C | EPON ® 828 | UVR-6110 | (°C.) |
| 10 | 90 | 0 | 70 |
| 10 | 81 | 9 | 63 |
| 10 | 72 | 18 | 52 |
| 10 | 63 | 27 | 41 |
| 10 | 54 | 36 | 30 |
| 10 | 45 | 45 | 25 |
| 10 | 36 | 54 | <23 |
| 10 | 27 | 63 | <23 |
| 10 | 18 | 72 | <23 |
| 10 | 9 | 81 | <23 |
| 20 | 80 | 0 | 60 |
| 20 | 72 | 8 | 56 |

TABLE VI-continued

Cloud Points of Ternary Blends of Epoxidized Polymer F, EPON ® 828, and UVR-6110

| Blend Composition, Wt % | | | Cloud Point |
|---|---|---|---|
| Polymer C | EPON ® 828 | UVR-6110 | (°C.) |
| 20 | 64 | 16 | 45 |
| 20 | 56 | 24 | 35 |
| 20 | 48 | 32 | 26 |
| 20 | 40 | 40 | <23 |
| 20 | 32 | 48 | <23 |
| 20 | 24 | 56 | <23 |
| 20 | 10 | 64 | <23 |
| 20 | 8 | 72 | <23 |

The cloud points of the ternary blends listed in Table VI are all well below 150° C. Thus, epoxidized polymers blended with aromatic and cycloaliphatic epoxy resins are suitable for use in the present invention.

removed, and their physical properties tested. The mechanical properties of the resultant rubber modified epoxy resins are listed in Table VII.

In Table VII the control is an unmodified EPON® 826 resin. Cured resins containing epoxidized polymer A at the 10% level experienced a 261% increase in fracture energy ($G_{IC}$) while maintaining high tensile strengths and elongations and good flexural properties. Cured resins containing epoxidized polymer B experienced increases of 254 % and 561% in fracture energy with 10% and 20% epoxidized polymer, respectively. Cured resins containing the comparative polymer I at the 10% level experienced a 22% increase in fracture energy while suffering loss of tensile strength and elongation and flexural strength and strain. These results demonstrate that polymers of the invention having structures of I-B with high epoxy content and thus improved compatibility are effective in achieving a superior balance of properties in epoxy resins cured with anhydrides. When poor compatibility of epoxidized polymer and epoxy resin results, as in the case of comparative Polymer I and EPON® 826 resin, only insignificant increase in toughness is observed along with a significant degradation of tensile and flexural properties.

TABLE VII

Mechanical Properties of Modified EPON ® 826

| modifier and level | tensile properties | | | tensile fracture toughness | | flexural properties | | | $T_g$ (°C.) |
|---|---|---|---|---|---|---|---|---|---|
| | strength (psi) | elongation (%) | Young's modulus (psi) | $K_{IC}$ (psi in$^{1/2}$) | $G_{IC}$ (J/m$^2$) | modulus (psi) | stress at failure (psi) | strain at failure (%) | |
| Control | 11,850 | 6.6 | 434,000 | 452 | 74 | 483,000 | 19,300* | 5.0* | 156 |
| 10% A | 11,730 | 5.0 | 442,000 | 875 | 267 | 461,000 | 18,400* | 5.0* | 150 |
| 10% B | 11,440 | 4.5 | 423,900 | 849 | 262 | 461,000 | 18,800 | 5.7 | 148 |
| 20% B | 7,220 | 2.3 | 370,100 | 1096 | 489 | 399,000 | 15,300 | 4.7 | 140 |
| 10% I | 8,500 | 2.7 | 420,000 | 496 | 90 | 420,000 | 13,100 | 3.4 | 154 |

*Samples did not fail. Stress at 5% strain is reported.

Example 6

A controlled amount of the epoxidized polymer having the structure I-B (polymer A or B) or CI-B). (polymer I) was added to EPON® 826 resin. In this example and the ones following, the amount of epoxidized polymer is expressed as the percentage by weight of the mass of epoxy resin plus epoxidized polymer. The total epoxy content of the blend was calculated from knowledge of the epoxy level of the epoxidized polymer and the epoxy equivalent weight of EPON® 826 resin (182 g/mole of epoxy functionality). A stoichiometric amount of MTHPA, or a mass such that there was present one anhydride group for every epoxy group, was measured into a separate container. Both masses were heated to 100° C. and then mixed together. 1 part of EMI per hundred parts of the epoxidized polymer plus EPON® 826 resin was added to accelerate the curing reaction. After thorough mixing, the mixture was poured into a glass mold at 120° C. The blend containing polymer A was optically clear at this point. The blend containing comparative polymer I was cloudy at this point. The mold was held at 120° C. for 2 hours and then heated to 150° and held at this temperature for 4 hours. The molds were then cooled to room temperature, the rubber modified epoxy resin plaques

Example 7

A controlled amount of the epoxidized polymers having the structure I/S-B-I/S (polymers D and E) or I/S-B (polymers F and G) was added to EPON®826 resin according to the protocol specified in Example 6. After thorough mixing of the epoxidized polymer, EPON® 826 resin, MTHPA, and EMI, the blend was poured into a mold at 120° C. The blends containing epoxidized polymers D, E, F, and G were optically clear at this point. Curing was continued as in Example 6. The mechanical properties of the resultant rubber modified epoxy resins are listed in Table VIII.

Cured resins containing epoxidized polymers D, E, F, and G at the 10% level experienced an increase in fracture energy ($G_{IC}$) ranging from 212% to 253% while maintaining high tensile strengths and elongations and good flexural properties. The cured resin containing epoxidized polymer G at the 20% level experienced a 435% increase in tensile fracture toughness while maintaining high tensile strengths and elongations and good flexural properties. These results demonstrate that polymers of the invention having structures of I/S-B-I/S or I/S-B are effective in achieving a superior balance of properties in epoxy resins cured with anhydrides.

TABLE VIII

Mechanical Properties of Modified EPON ® 826

| modifier and level | tensile properties | | | tensile fracture toughness | | flexural properties | | | $T_g$ (°C.) |
|---|---|---|---|---|---|---|---|---|---|
| | strength (psi) | elongation (%) | Young's modulus (psi) | $K_{IC}$ (psi in$^{1/2}$) | $G_{IC}$ (J/m$^2$) | modulus (psi) | stress at failure (psi) | strain at failure (%) | |
| Control | 11,850 | 6.65 | 434,000 | 452 | 74 | 483,000 | 19,300* | 5.0* | 156 |
| 10% D | 9,625 | 3.22 | 401,000 | 817 | 257 | 448,000 | 17,700 | 5.4 | 150 |
| 10% E | 10,430 | 3.17 | 446,000 | 829 | 238 | 474,000 | 16,600 | 3.9 | 140 |
| 20% F | 11,620 | 4.7 | 438,000 | 961 | 261 | 471,000 | 18,800 | 5.4 | 147 |
| 10% G | 11,590 | 4.1 | 444,000 | 816 | 231 | 478,000 | 19,100 | 5.0 | 145 |
| 20% G | 9,830 | 4.0 | 398,000 | 1,022 | 396 | 420,000 | 17,200 | 5.7 | 136 |

*Samples did not fail. Stress at 5 % strain is reported.

Example 8

A controlled amount of the epoxidized polymer having the structure I-S/B-I (polymer H) was added to EPON® 826 resin according to the protocol specified in Example 6. After thorough mixing of the epoxidized polymer, EPON® 826 resin, MTHPA, and EMI, the blend was poured into a mold at 120° C. The blends containing epoxidized polymer H were optically clear at this point. Curing was continued as in Example 6. The mechanical properties of the resultant rubber modified epoxy resins are listed in Table IX.

Cured resins containing epoxidized polymer H at the 10% and 20% level experienced increases in tensile fracture toughness ($K_{IC}$) of 108% and 144 % respectively while maintaining good flexural properties. These results demonstrate that polymers of the invention having structures of I-B/S-I are effective in achieving a superior balance of properties in epoxy resins cured using anhydrides.

TABLE IX

Mechanical Properties of Modified EPON ® 826

| modifier and level | tensile fracture toughness $K_{IC}$ (psi in$^{1/2}$) | flexural properties | | | $T_g$ (°C.) |
|---|---|---|---|---|---|
| | | modulus (psi) | stress at failure (psi) | strain at failure (%) | |
| Control | 452 | 480,000 | 20,400 | 6.3 | 156 |
| 10% H | 939 | 458,000 | 18,600 | 6.2 | 148 |
| 20% H | 1,104 | 406,000 | 15,600 | 4.8 | 146 |

Example 9

A controlled amount of epoxidized polymer E was added to EPON® 826 resin as specified in Example 6. Blends of anhydride curing agents MTHPA and DSA were made containing 10% and 20% DSA. A stoichiometric amount of the DSA/MTHPA blend, or a mass such that there was present one anhydride group for every epoxy group, was measured into a separate container. The epoxidized polymer/epoxy resin/anhydride curing agent/accelerator blend was made and mixed according to the protocol specified in Example 6. Upon pouring into the mold at 120° C., the blends were optically clear. Curing was continued as in Example 6. The mechanical properties of the resultant rubber modified epoxy resins are listed in Table X.

Incorporation of the epoxidized polymers leads to increases in fracture energy ($G_{IC}$) for the samples with 10% and 20% DSA curing agent levels of 408% and 137%, respectively, while maintaining high tensile strengths and elongations and good flexural properties. These results demonstrate that the epoxidized diene polymers are effective at achieving a superior balance of properties in curing systems containing mixtures of anhydrides.

TABLE X

Mechanical Properties of Modified EPON ® 826

| modifier and level | tensile properties | | | tensile fracture toughness | | flexural properties | | | $T_g$ (°C.) |
|---|---|---|---|---|---|---|---|---|---|
| | strength (psi) | elongation (%) | Young's modulus (psi) | $K_{IC}$ (psi in$^{1/2}$) | $G_{IC}$ (J/m$^2$) | modulus (psi) | stress at failure (psi) | strain at failure (%) | |
| Control 90MTHPA/10DSA | 10,940 | 6.7 | 436,000 | 467 | 79 | 468,000 | 19,000* | 5.0* | 136 |
| 10% E 90MTHPA/10DSA | 9,040 | 3.5 | 377,000 | 990 | 401 | 421,000 | 16,200 | 4.8 | 112 |
| Control 80MTHPA/20DSA | 9,840 | 7.7 | 393,000 | 464 | 86 | 444,000 | 17,700* | 5.0* | 120 |
| 20% E 90MTHPA/10DSA | 9,360 | 2.9 | 422,000 | 747 | 204 | 449,000 | 17,300 | 4.7 | 130 |

*Samples did not fail. Stress at 5% strain is reported.

Example 10

A controlled amount of epoxidized polymer F having the structure I/S-B or epoxidized polymer C having the structure I-B was added to EPON® 828. 33 parts of EPI-CURE® 3140 (a polyamide curing agent) per hundred parts of EPON® 828 resin plus epoxidized polymer were added to the mixture and stirred by hand. A small amount (less than 1 part per hundred parts of EPON® 828 resin plus epoxidized polymer) of PC-1344/monofunctional glycidyl epoxy solution was added to aid in defoaming the mixture. The blend was alegassed in vacuum and centrifuged. The blend was poured into a glass mold and held at room temperature at least 7 days before testing. The mechanical properties of the resultant rubber modified epoxy resins are listed in Table XI.

Incorporation of epoxidized polymers C and F at the 10% level leads to increases in fracture energy ($G_{IC}$) of 78% and 94%, respectively, while maintaining good tensile and flexural properties. These results demonstrate that the epoxidized polymers are effective at achieving a superior balance of properties in epoxy resins cured with polyamides.

120° C. for 2 hours and then heated to 150° C. and held at this temperature for 4 hours. The molds were then cooled to room temperature, the rubber modified epoxy resin plaques removed, and their physical properties tested. The mechanical properties of the resultant rubber modified epoxy resins are listed in Table XII.

Incorporation of the epoxidized polymer at the 10% level led to an increase in fracture energy ($G_{IC}$) of 50% while maintaining good tensile and flexural properties. Incorporation of 20% polymer G led to further increases in toughness. These results demonstrate that the epoxidized polymer is effective at achieving a superior balance of properties in epoxy resins cured with amines.

Example 12

A blend was prepared having equal parts by weight of EPON® 828 resin and UVR-6110. A controlled amount of epoxidized polymer C was added. The modified, blended epoxidized resin was cured using MTHPA and EMI as in Example 6. The mechanical properties of the resultant rubber modified epoxy resins are listed in Table XIII. The results demonstrate that incorporation of the epoxidized polymers lead to significant increases in toughness of blended aromatic and cycloaliphatic epoxy resins.

TABLE XI

Mechanical Properties of Modified EPON ® 828

| modifier and level | tensile properties | | | tensile fracture toughness | | flexural properties | | | $T_g$ (°C.) |
|---|---|---|---|---|---|---|---|---|---|
| | strength (psi) | elongation (%) | Young's modulus (psi) | $K_{IC}$ (psi in$^{1/2}$) | $G_{IC}$ (J/m$^2$) | modulus (psi) | stress at failure (psi) | strain at failure (%) | |
| Control | 4,000 | 13.9 | 341,000 | 530 | 130 | 366,000 | 11,100* | 5.0* | 53 |
| 10% C | 5,260 | 5.5 | 332,000 | 708 | 231 | 335,000 | 9,800 | 4.9 | 59 |
| 10% F | 3,820 | 14.5 | 309,000 | 714 | 252 | 322,000 | 10,000 | 5.0* | 59 |

*Samples did not fail. Stress at 5% strain is reported.

Example 11

A controlled amount of epoxidized polymer G having the structure I/S-B was added to EPON® 828 resin. An amount of diethyl toluene diamine was added so that there was one amine hydrogen for every epoxy group. The blend was heated to 100° C. and mixed thoroughly. The blend was then poured into a glass mold at 120° C. The mold was held at

TABLE XII

Mechanical Properties of Modified EPON ® 828

| modifier and level | tensile properties | | | tensile fracture toughness | | flexural properties | | | $T_g$ (°C.) |
|---|---|---|---|---|---|---|---|---|---|
| | strength (psi) | elongation (%) | Young's modulus (psi) | $K_{IC}$ (psi in$^{1/2}$) | $G_{IC}$ (J/m$^2$) | modulus (psi) | stress at failure (psi) | strain at failure (%) | |
| Control | 9,560 | 4.1 | 364,600 | 610 | 161 | 400,000 | 16,000* | 5.0* | 177 |
| 10% G | 9,670 | 6.1 | 322,300 | 716 | 242 | 345,000 | 12,300 | 4.4* | 177 |
| 20% G | 6,514 | 3.4 | 279,400 | 1026 | 553 | 278,000 | 10,700* | 5.0* | — |

*Samples did not fail. Stress at 5% strain is reported.

TABLE XIII

Mechanical Properties of Modified EPON ® 828

| modifier and level | tensile fracture toughness $K_{IC}$ (psi in$^{1/2}$) | flexural properties modulus (psi) | flexural properties stress at failure (psi) | flexural properties strain at failure (%) | $T_g$ (°C.) |
| --- | --- | --- | --- | --- | --- |
| Control | 430 | 490,000 | 19,900* | 5.0* | 186 |
| 10% C | 627 | 434,000 | 16,200 | 4.4 | 176 |

*Samples did not fail. Stress at 5% strain is reported.

Example 13

The procedure of Example 11 was repeated with the exception that 1 part of EMI per 100 parts of the epoxidized polymer plus epoxy resin was added to catalyze the cure reaction of epoxidized polymer and epoxy resin. The mechanical properties of the resultant rubber modified epoxy resins are listed in Table XIV. These results demonstrate that incorporation of the epoxidized polymers leads to a significant increase in toughness in accelerated amine cured epoxy resins.

TABLE XIV

Mechanical Properties of Modified EPON ® 828

| modifier and level | tensile fracture toughness $K_{IC}$ (psi in$^{1/2}$) | flexural properties modulus (psi) | flexural properties stress at failure (psi) | flexural properties strain at failure (%) |
| --- | --- | --- | --- | --- |
| Control | 510 | 511,000 | 20,200* | 5.0* |
| 10% G | 804 | 431,000 | 16,400 | 4.9 |

*Samples did not fail. Stress at 5% strain is reported.

Example 14

A controlled amount of epoxidized polymer G was added to a blend of 75% by weight EPON® 828 resin and 25% by weight cresyl glycidyl ether, a monofunctional epoxy resin. The average weight per epoxy was calculated. The blend was cured using MTHPA/EMI as in Example 6.

Cured plaques were obtained that showed no signs of surface or bulk segregation of the rubber. The plaques were rigid and the rubber was judged to be phase separated but homogeneously distributed throughout the sample. These results demonstrate that epoxidized polymers are useful rubber modifiers in blends of monofunctional and difunctional epoxy resins.

Example 15

A controlled amount of epoxidized polymer G was added to a blend of 75% by weight EPON® 828 resin and 25% by weight trimethylolpropane triglycidyl ether, a trifunctional epoxy resin. The average weight per epoxy was calculated. The blend was cured using MTHPA/EMI as in Example 6.

Cured plaques were obtained that showed no signs of surface or bulk segregation of the rubber. The plaques were rigid and the rubber was judged to be phase separated but homogeneously distributed throughout the sample. These results demonstrate that epoxidized polymers are useful rubber modifiers in blends of multifunctional and difunctional epoxy resins.

Example 16

A controlled amount of epoxidized polymer A having the structure I-B or epoxidized polymer F having the structure I/S-B was added to EPON® 828 resin. 33 parts of EPI-CURE® 3140 polyamide curing agent per hundred parts of EPON® 828 resin plus epoxidized polymer were added to the mixture and stirred by hand. A small amount (less than 1 part per hundred parts of EPON® 828 resin plus epoxidized polymer) of PC-1344 defoamer (manufactured by Monsanto) in cresyl glycidyl epoxy solution was added to aid in defoaming the mixture. The blend was alegassed in vacuum and centrifuged. This cured epoxy was used to bond two aluminum strips together. The epoxy was cured one day at room temperature followed by one hour at 100° C. The lap shear strength was measured after cure and is listed in Table XV.

TABLE XV

Lap Shear Strength of Rubber Modified EPON ® 828

| Modifier and Level | Shear Strength (psi) |
| --- | --- |
| Control - no modifier | 917 |
| 10% A | 950 |
| 10% F | 1220 |

At 10% levels epoxidized polymers A and F yield increases in shear strength of 4% and 33%, respectively. These results demonstrate that incorporation of epoxidized polymers leads to increased strength of EPON® 828 resin adhesives.

Example 17

A blend of 10% epoxidized polymer H having the structure I-S/B-I in EPON® 826 resin was made. A comparative blend containing 10% HYCAR 1300×8 carboxy terminated butadiene acrylonitrile copolymer manufactured by B. F. Goodrich in EPON® 826 resin was made. The viscosities were measured using a Brookfield viscometer. The results are listed in Table XVI.

TABLE XVI

Viscosity of Blends of 10% Rubber in EPON ® 826

| Polymer | Viscosity-Poise @ 50° C. | Viscosity-Poise @ 75° C. | Viscosity-Poise @ 100° C. |
| --- | --- | --- | --- |
| H | 7.42 | 1.42 | 0.43 |
| HYCAR 1300 × 8 | 9.82 | 2.02 | 0.80 |

These results show that the blend containing epoxidized polymer H has a lower viscosity than the comparative blend containing HYCAR 1300×8. Thus, epoxidized polymer H possesses the processing advantage of giving blends with epoxy resins having lower viscosities.

We claim:

1. A toughened epoxy resin composition comprising:
   (a) a curable aromatic epoxy resin,
   (b) an epoxidized low viscosity polydiene polymer which contains less than 5% by weight of a vinyl aromatic hydrocarbon wherein the polymer contains from 4.5 to 5.5 milliequivalents of epoxy per gram of polymer, and has the structural formula $(A-B-A_p)_n-Y_r-(A_q-B)_m$ wherein Y is a coupling agent or coupling monomers or initiator, and wherein A and B are polymer blocks which may be homopolymer blocks of conjugated diolefin monomers or copolymer blocks of conjugated diolefin monomers, the A blocks have a molecular weight of from 100 to 6,000 and the B blocks have a molecular weight of from 1000 to 15,000, n is greater than 0, r is 0 or 1, m is greater than or equal to 0, n+m ranges from 1 to 100, and p and q may be 0 or 1, and
   (c) a curing agent.

2. The composition of claim 1 wherein the curing agent is selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids other than polycarboxylic acids, and polycarboxylic acids.

3. The composition of claim 1 wherein the curing agent is selected from the group consisting of aliphatic amines, aromatic amines, polyamides, amido amines and imidazoles.

4. The composition of claim 1 wherein the aromatic epoxy resin is a glycidyl ether prepared by the reaction of epichlorohydrin with an aromatic compound containing at least two hydroxy group carried out under alkaline reaction conditions.

5. The composition of claim 1 wherein the concentration of the epoxidized polymer ranges from 1 to 50% by weight of the composition.

6. The composition of claim 1 wherein an accelerator is added and the composition is cured.

7. The composition of claim 6 wherein the accelerator is selected from the group consisting of trialkyl amines, hydroxyl containing compounds, benzyl dimethyl amine, 2-ethyl-4-methyl imidazole, $BF_3$ amine complexes, phosphines, and Lewis acid compounds.

8. A structural adhesive composition comprising the composition of claim 1.

9. The composition of claim 1 wherein the epoxidized polymer is polyisoprene and has a molecular weight of from 1000 to 20,000.

10. The composition of claim 9 wherein an accelerator is added and the composition is cured.

11. A structural adhesive composition comprising the composition of claim 9.

12. The composition of claim 1 wherein the epoxidized polymers are randomly polymerized star copolymers of at least two conjugated diolefin monomers and contain di-, tri- and/or tetrasubstituted olefinic epoxides and wherein each arm has a molecular weight from 1500 to 15,000.

13. The composition of claim 12 wherein an accelerator is added and the composition is cured.

14. A structural adhesive composition comprising the composition of claim 12.

* * * * *